(12) United States Patent
Robinson et al.

(10) Patent No.: US 6,598,479 B1
(45) Date of Patent: Jul. 29, 2003

(54) INTEGRAL MAGNET VIBRATION SENSOR

(75) Inventors: James C. Robinson, Knoxville, TN (US); Kenneth R. Piety, Knoxville, TN (US); Bradley D. Pardue, Blaine, TN (US)

(73) Assignee: CSI Technology, Inc., Wilmington, DE (US)

( * ) Notice: Subject to any disclaimer, the term of this patent is extended or adjusted under 35 U.S.C. 154(b) by 0 days.

(21) Appl. No.: 09/988,926

(22) Filed: Nov. 19, 2001

(51) Int. Cl.$^7$ ................................................. G01H 11/06
(52) U.S. Cl. ......................................................... 73/658
(58) Field of Search ........................ 73/649, 658, 660, 73/570, 593, 431, 866.5

(56) References Cited

U.S. PATENT DOCUMENTS

| | | |
|---|---|---|
| 4,237,454 A | 12/1980 | Meyer |
| 4,483,180 A | 11/1984 | Ohbuchi et al. |
| 4,771,637 A | 9/1988 | Kubler |
| 5,379,643 A | 1/1995 | Taylor |
| 5,546,809 A | 8/1996 | Cotton |
| 5,646,340 A | 7/1997 | Gee et al. |
| 5,854,994 A | 12/1998 | Canada et al. |
| 5,907,491 A | 5/1999 | Canada et al. |
| 5,945,603 A | 8/1999 | Shih |
| 6,213,442 B1 * | 4/2001 | Ivers et al. .................. 248/550 |

FOREIGN PATENT DOCUMENTS

| | | | | |
|---|---|---|---|---|
| JP | 402008715 A | * | 1/1990 | .................. 73/649 |
| JP | 402008716 A | * | 1/1990 | .................. 73/649 |

\* cited by examiner

Primary Examiner—Richard A. Moller
(74) Attorney, Agent, or Firm—Luedeka, Neely & Graham, P.C.

(57) ABSTRACT

An integral magnet vibration sensor apparatus optimizes sensor response in a non-permanently attachable package. In a preferred embodiment of the invention, the apparatus includes a housing having a magnet, a vibration sensor, and a conditioning circuit disposed within the housing. The magnet enables the apparatus to be magnetically attached to a machine. The vibration sensor senses machine vibration when the apparatus is attached to the machine, and the conditioning circuit optimizes the frequency response of the vibration sensor in a preferred embodiment by reducing the gain of the sensor output at resonance.

16 Claims, 2 Drawing Sheets

INTEGRAL MAGNET VIBRATION SENSOR

FIELD OF THE INVENTION

The present invention relates generally to vibration sensors. More particularly, the present invention relates to a vibration sensor module having an integral magnet for attaching the vibration sensor to a machine.

BACKGROUND OF THE INVENTION

Industrial and manufacturing facilities typically employ large electrically powered machines to provide the horsepower and motive forces needed for production. Proper operation of such machines is often essential to meeting production needs. To this end, production facilities often adopt predictive maintenance programs in which machines are periodically monitored to ensure proper operation. Many predictive maintenance programs employ vibration analysis as a way to assess the health of the machine. During vibration analysis, a vibration sensor, or accelerometer, is positioned against the machine to be monitored and the accelerometer output is analyzed to detect the presence of anomalous operating conditions.

A variety of methods are used for maintaining contact between the accelerometer and the machine being monitored. For example, the accelerometer can be configured to be manually held against the machine as data is taken. Other methods allow for permanent attachment of the accelerometer to the machine (such as by threaded fastener or adhesive) to enable hands-free taking of data. However, such permanent mounting methods are less than desirable due to the labor and costs involved, and the use of attachment methods which do not permanently affix the accelerometer to the machine have historically proven to be disadvantageous as a result of poor sensor response.

Therefore, there is a need for an effective method of non-permanently attaching a vibration sensor to a machine.

SUMMARY OF THE INVENTION

The present invention eliminates the difficulties and disadvantages of the prior art by configuring a vibration sensor to be non-permanently attached to a machine. In accordance with a preferred embodiment of the invention, the inventive vibration sensor apparatus includes a housing having a first end and a second end. A magnet for magnetically and removably attaching the apparatus to a machine is disposed within the housing adjacent the first end and rigidly affixed thereto. A vibration sensor disposed within the housing adjacent the magnet senses vibration produced by the machine and outputs a sensor signal corresponding to the sensed vibration. The vibration sensor, which may be a single axis or a multiple axis sensor, is in rigid relation to the magnet and electrically isolated therefrom. Also disposed within the housing is a conditioning circuit for conditioning the sensor signal. At the resonant frequency of the apparatus, the conditioned sensor signal preferably has a gain of less than 20 dB relative to the sensor's linear response range. A connector adjacent the second end of the housing enables a peripheral device, such as a portable data collector, to access the sensor signal over a broad frequency band.

In accordance with one aspect of the preferred embodiment, the sensor signal may be output by the vibration sensor in the form an electrical charge. In the conditioning circuit, a filter (such as a two-pole, low pass filter) attenuates the sensor signal thereby providing acceptable response at the resonant frequency. The filtered sensor signal produced by the conditioning circuit is in the form of an electrical charge. A converter receives the filtered sensor signal and converts it from an electrical charge to a corresponding voltage for use by the peripheral device.

To enhance the stability of the apparatus when being attached to an uneven machine surface, a plurality of feet are rigidly attached to the first end of the housing so that both feet contact the machine surface when the apparatus is magnetically attached to the machine.

BRIEF DESCRIPTION OF THE DRAWINGS

One or more preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

Figure 1:
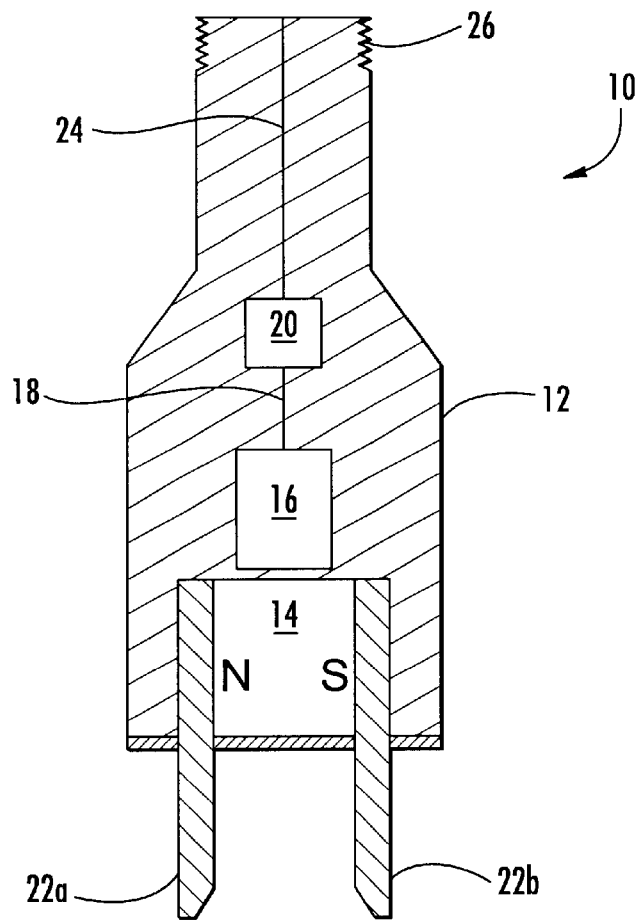
FIG. 1 is a cross-section view of an integral magnet accelerometer sensor in accordance with the invention.

With reference now to the drawings in which like reference characters designate like or similar parts throughout the several views, FIG. 1 provides a cross-section view of a preferred embodiment of an integral magnet accelerometer sensor in accordance with the invention. In the preferred embodiment shown in FIG. 1, the integral sensor is in the form of a module 10 which is magnetically attached to a machine. The module 10 includes a housing 12 which houses a magnet 14 used for removably attaching the module 10 to a machine. The magnet 14 is preferably a permanent magnet with a north pole (N) and a south pole (S) as shown. A vibration sensor 16 (such as an accelerometer) is preferably positioned adjacent the magnet 14 in alignment with the module's central axis. The vibration sensor 16 is electrically isolated from the magnet 14.

When the module 10 is attached to a machine, vibration generated by the machine is transmitted to the module 10 and sensed by the vibration sensor 16 which outputs a signal on line 18 corresponding to the sensed vibration. As used herein, the term "line" is given broad construction and is used to refer to a single electrically conducting wire as well as a plurality of wires for conducting signals. Sensor response (i.e., the usable frequency range of the sensor) is improved by keeping the module 10 and its components as stiff as possible. Therefore, the vibration sensor 16 and magnet 14 are preferably positioned within the module housing 12 in rigid relation to one another. Sensor response is also improved by positioning the vibration sensor 16 adjacent the magnet 14. The magnet 14 and vibration sensor 16 can be positioned within the housing 12 by any acceptable means of attachment. In a preferred embodiment, the magnet 14 and vibration sensor 16 are potted into the housing 12 with an epoxy with the magnetic poles (N, S) of the magnet aligned substantially parallel to the machine surface onto which the module 10 is attached.

The vibration sensor 16 may include any sensor type capable of sensing vibration and producing an output corresponding to sensed vibration. In a preferred embodiment, the vibration sensor 16 includes a piezoelectric-type sensing element. The vibration sensor 16 may include a single sensing element for sensing vibration along a single axis, or direction. Alternatively, the vibration sensor 16 may include two or more sensing elements for sensing vibration along multiple axes. For example, the vibration sensor 16 may include one sensing element aligned to sense vibration along the machine's rotational axis and a second sensing element for sensing vibration in a direction normal to the machine's rotational axis.

Many machines which the module 10 may be used to monitor have uneven surfaces onto which the module 10 will be attached. For example, the outer casing of most electric motors are rounded. To enhance the stability of the module 10 and prevent it from moving when attached to an uneven machine surface, the module 10 is preferably provided with feet 22a, 22b. Each of the feet 22a, 22b are fabricated from a magnetically attractable material and positioned adjacent opposed ends of the magnet 14, as shown in FIG. 1, so that one foot (22a) is magnetic north and the other foot (22b) is magnetic south. To improve rigidity, the feet 22a, 22b are attached to the magnet 14, such as by an adhesive or welding. The feet 22a, 22b extend below the housing 12 and make contact with the machine to which the module 10 is attached.

With continued reference to FIG. 1, a conditioning circuit 20 is associated with the housing 12 and is preferably positioned within the housing 12. The conditioning circuit 20 may be configured to perform a desired conditioning of the sensor output 18, including amplifying, attenuating, filtering, or the like. In a preferred embodiment, the conditioning circuit 20 is configured to attenuate the vibration sensor output to improve the sensor's frequency response, as further discussed below. The conditioned sensor signal produced by the conditioning circuit 20 is made available to a peripheral device, such as a portable data collector, on line 24. The module 10 may be configured to utilize any acceptable means for interfacing with the peripheral device. In a preferred embodiment, the upper end of the module housing 10 includes a threaded connector 26 which serves as an output port to enable the peripheral device to securely connect with the module 10.

Figure 2:
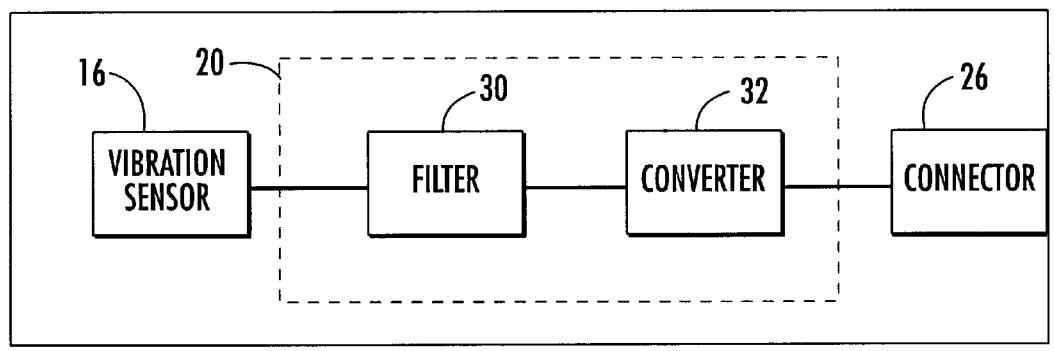
FIG. 2 is a functional block diagram of an integral magnet accelerometer sensor in accordance with the invention.

As shown in the functional block diagram of FIG. 2, the output of the vibration sensor 16 is processed by a conditioning circuit 20 and the conditioned sensor signal is made available to a peripheral device at connector 26. In a preferred embodiment, the conditioning circuit 20 is advantageously disposed in the module housing 12 in close proximity to the vibration sensor 16 to improve the sensor's frequency response. As previously stated, the vibration sensor 16 is preferably a piezoelectric-type transducer, which inherently produces a high impedance output. To maximize the usefulness of the sensor's output, it should be converted to low impedance.

Processing the high impedance output of the vibration sensor 16 in close proximity to the sensor 16 significantly reduces the amount of noise and other losses which otherwise can be expected to degrade the vibration sensor output. Also, by placing the vibration sensor 16, conditioning circuit 20, and magnet 14 all in one housing 12, the frequency response of the sensor 16 is improved due to the low total mass and high stiffness of the module 10.

By integrating the vibration sensor 16 and magnet 14, the parameters of the conditioning circuit 20 can be optimized to obtain a substantially linear response of the sensor 16 within ±3 dB up to 10 KHz. Associating the conditioning circuit 20 with the module housing 12 by placing it within the housing 12 also enables processing of the vibration sensor output to be optimized at all times within the module 10 itself, which in turn reduces inconsistency in data readings and enhances the vibration sensor's frequency response characteristics. Preferably, the conditioning circuit 20 is configured to attenuate the vibration sensor output at resonance to a level of no more than 15 dB relative to the substantially linear response region of the sensor 16. Since the resonant frequency and total mass of the module 10 are known and constant, the parameters of the conditioning circuit 20 can be permanently set for optimization of the sensor's frequency response in any application.

In a preferred embodiment, the conditioning circuit 20 includes a filter 30 which reduces the level of electrical charge (i.e., attenuates the gain of the signal) that is output by the piezoelectric sensing element of the vibration sensor 16 around resonant frequency of the sensor 16. If the sensor output is left unattenuated, it could quickly reach a runaway condition at resonance and saturate the electronics used to analyze the sensor output. Such a "runaway" condition renders the sensor output useless. Thus, reducing the gain at resonance of the vibration sensor output increases the usable frequency range of the sensor output by lowering the vibration sensor signal to an acceptable level at the resonant frequency of the module 10. However, too much gain reduction has the undesirable effect of reducing the sensor's bandwidth. Therefore, in selecting the conditioning circuit parameters for attenuation of the sensor output 18, the object is to optimize sensitivity with gain reduction. The optimal parameters will largely depend on the overall mass and stiffness of the sensor module 10.

While any filtering technique capable of appropriately reducing the electrical charge of the vibration sensor signal may be suitable for use in the invention, a preferred embodiment of the invention employs a two-pole, low-pass filter. The output of filter 30 is received by a converter 32 which converts the filtered sensor signal from an electrical charge to a corresponding voltage for use by a peripheral device.

Figure 3:
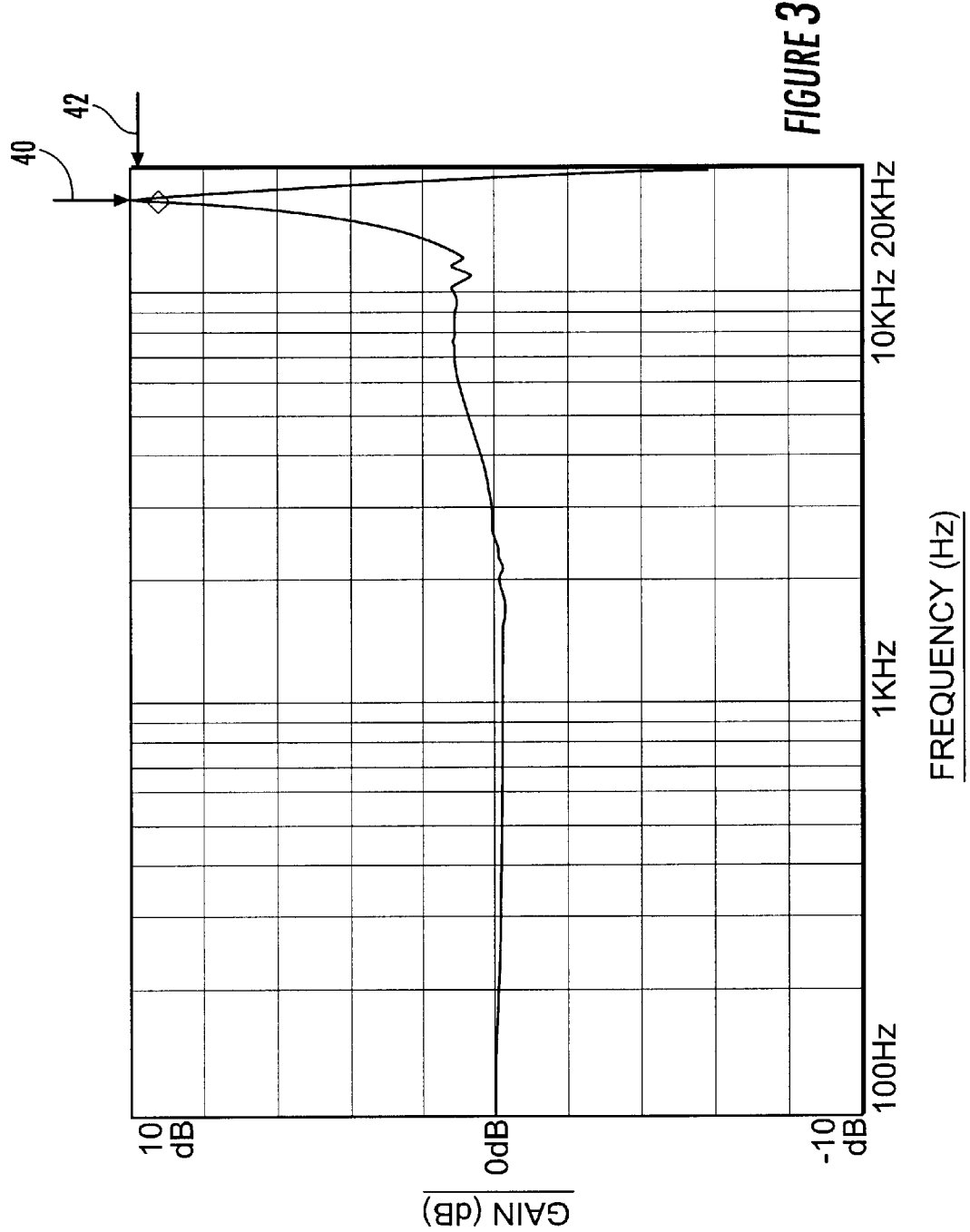
FIG. 3 is a graph showing the frequency response of an integral magnet accelerometer in accordance with the invention.

FIG. 3 graphically illustrates the observed frequency response of an integral magnet accelerometer sensor in accordance with the invention where signal gain is given along the vertical axis (left) in increments of 2 dB per division and frequency in Hertz is given along the horizontal axis (bottom). The measured sensor module had a weight of about 125 grams. The conditioning circuit parameters included a two-pole, low-pass filter with a 3 dB point at 10 KHz. The charge converter parameters were 10 pC/g.

As shown in FIG. 3, the resonant frequency (indicated at arrow 40) was found to be approximately 16.84 kHz and the gain at resonance (indicated at arrow 42) was approximately 9.28 dB. Signal gain approached +3 dB at about 15 kHz. These measurements represent significant improvement over other non-permanently attached vibration sensors employing 2-rail magnets (i.e., magnets having two lines of contact with the machine).

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A vibration sensing apparatus for being attached to a machine, the apparatus having a resonant frequency, said apparatus comprising:

a housing having a first end and a second end;

a magnet disposed within said housing adjacent the first end and rigidly affixed thereto for magnetically attaching the apparatus to the machine;

a vibration sensor disposed within said housing adjacent said magnet for sensing vibration produced by the machine and producing a sensor signal in the form of an electrical charge corresponding to sensed vibration, said vibration sensor being in rigid relation to said magnet and electrically isolated therefrom;

a conditioning circuit associated with said housing for conditioning the sensor signal and producing a conditioned sensor signal, said conditioning circuit including:
    a filter for receiving the sensor signal and attenuating the sensor signal at the resonant frequency of the apparatus, producing a filtered sensor signal in the form of an electrical charge; and
    a converter for converting the filtered sensor signal from an electrical charge to an electrical voltage for use by a peripheral device; and
an output port adjacent the second end of the housing for outputting the conditioned sensor signal to the peripheral device.

2. The apparatus of claim 1, further comprising a plurality of feet rigidly attached to the first end of said housing for contacting a machine surface when the apparatus is magnetically attached to the machine.

3. The apparatus of claim 1 wherein said output port includes a threaded connector to facilitate attachment of the apparatus to the peripheral device.

4. The apparatus of claim 1 wherein said filter is a two-pole, low-pass filter.

5. The apparatus of claim 1 wherein said vibration sensor is a single axis sensor.

6. The apparatus of claim 1 wherein said vibration sensor is a multiple axis sensor.

7. A vibration sensing apparatus for being attached to a machine, the apparatus having a resonant frequency, said apparatus comprising:
    a housing having a first end and a second end;
    a magnet disposed within said housing adjacent the first end and rigidly affixed thereto for magnetically attaching the apparatus to the machine;
    a vibration sensor disposed within said housing adjacent said magnet for sensing vibration produced by the machine and producing a sensor signal corresponding to sensed vibration, said vibration sensor being in rigid relation to said magnet and electrically isolated therefrom;
    a conditioning circuit disposed within said housing for conditioning the sensor signal, producing a conditioned sensor signal;
    a plurality of feet rigidly attached to the first end of said housing for contacting a machine surface when the apparatus is magnetically attached to the machine, said plurality of feet inhibiting movement of the apparatus relative to the machine when the apparatus is attached to an uneven portion of the machine; and
    an output port adjacent the second end of the housing for outputting the conditioned sensor signal to a peripheral device.

8. The apparatus of claim 7 wherein said sensor signal is in the form of an electrical charge and said conditioning circuit includes:
    a filter for receiving the sensor signal and attenuating the sensor signal at the resonant frequency of the apparatus, producing a filtered sensor signal in the form of an electrical charge; and
    a converter for converting the filtered sensor signal from an electrical charge to an electrical voltage for use by the peripheral device.

9. The apparatus of claim 8 wherein said filter is a two-pole, low-pass filter.

10. The apparatus of claim 7 wherein said output port includes a threaded connector to facilitate attachment of the apparatus to the peripheral device.

11. The apparatus of claim 7 wherein said vibration sensor is a single axis sensor.

12. The apparatus of claim 7 wherein said vibration sensor is a multiple axis sensor.

13. The apparatus of claim 7 wherein said magnet is a permanent magnet.

14. A vibration sensing apparatus for being attached to a machine, the apparatus having a resonant frequency, said apparatus comprising:
    a housing having a first end and a second end;
    a magnet disposed within said housing adjacent the first end and rigidly affixed thereto for magnetically attaching the apparatus to the machine;
    a vibration sensor disposed within said housing adjacent said magnet for sensing vibration produced by the machine and producing a sensor signal corresponding to sensed vibration, said sensor signal including a substantially linear response range where the sensor signal varies by no more than ±3 dB over a bandwidth of frequencies up to 10 KHz, said vibration sensor being in rigid relation to said magnet and electrically isolated therefrom;
    a conditioning circuit disposed within said housing for conditioning the sensor signal, producing a conditioned sensor signal; and
    an output port adjacent the second end of the housing for outputting the conditioned sensor signal to a peripheral device.

15. The apparatus of claim 14 wherein said response at the resonant frequency is no more than 15 dB relative to the vibration sensor response in said substantially linear response range.

16. A vibration sensing apparatus for being attached to a machine, the apparatus having a resonant frequency, said apparatus comprising:
    a housing having a first end and a second end;
    a magnet disposed within said housing adjacent the first end and rigidly affixed thereto for magnetically attaching the apparatus to the machine;
    a vibration sensor disposed within said housing adjacent said magnet for sensing vibration produced by the machine and producing a sensor signal corresponding to sensed vibration, said sensor signal including a substantially linear response range, said vibration sensor being in rigid relation to said magnet and electrically isolated therefrom;
    a conditioning circuit associated with said housing for attenuating the sensor signal at resonance to a level of no more than 15 db relative to the vibration sensor response in said substantially linear response range, producing an attenuated sensor signal; and
    a connector adjacent the second end of the housing for outputting the attenuated sensor signal to a peripheral device.

\* \* \* \* \*